March 17, 1931.  E. PRICE ET AL  1,796,721
HANDLE FOR VALVE STEMS
Filed June 10, 1929
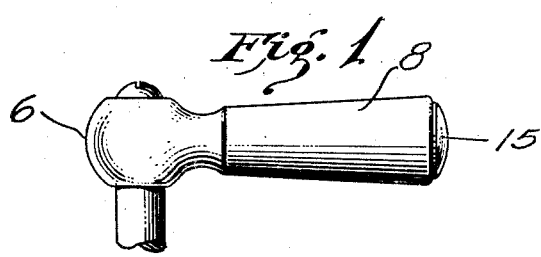
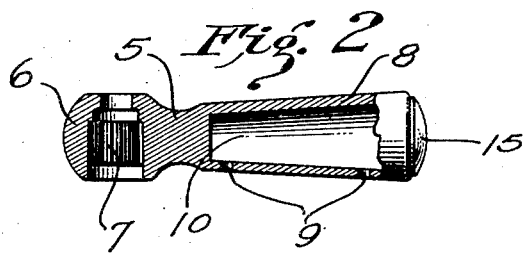
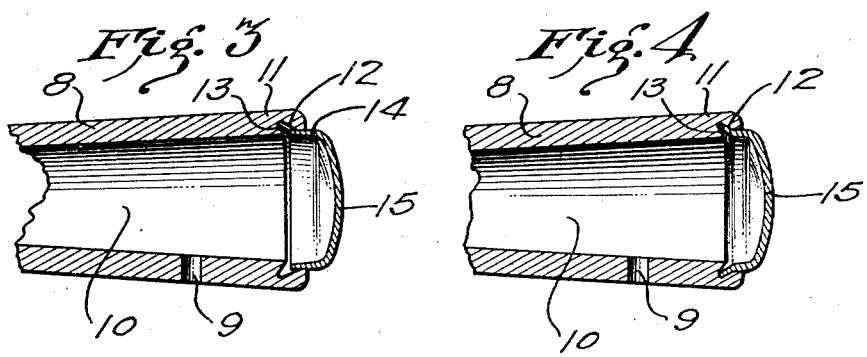
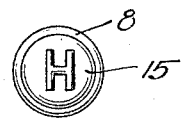
INVENTOR.
Emil Price
BY William A. Pfister
ATTORNEYS Patented Mar. 17, 1931

1,796,721

UNITED STATES PATENT OFFICE

EMIL PRICE AND WILLIAM A. PFISTER, OF LOS ANGELES, CALIFORNIA

HANDLE FOR VALVE STEMS

Application filed June 10, 1929. Serial No. 369,848.

This invention relates to handles for valve stems, and is particularly directed to that class of valves customarily found in bath fittings, and it has for its primary object the provision of a handle of the lever type as distinguished from a handle of the cross type of the form shown and described in our copending application for Letters Patent of the United States Serial No. 369,847, and an object of the invention is to provide a handle having a hollow cored lever which is open to the atmosphere to permit the handle to be ventilated so that it can be maintained in a cool state when associated with hot water fixtures.

A further object of the invention is to provide a handle of this type which is closed at one end, open between its ends to establish communication between the hollow of the handle and the outside atmosphere, and sealed at its opposite end, the latter characterizing feature of the invention being such as will bring into existence a new and useful means for contributing finish to the handle, while serving to brand or classify it into one useful in connection with a particular hot or cold water fitting.

In the accompanying drawings,

Figure 1 is a view in side elevation of the handle;

Figure 2 is a vertical longitudinal section therethrough;

Figure 3 is a view similar to Figure 2, but on a somewhat larger scale, showing the initial position of the classifying or sealing cap preparatory to swaging the edge wall of the cap; and Figure 4 is a view similar to Figure 3, showing the cap fully applied;

Figure 5 is a front view of the cap.

The handle comprises a body 5 formed to provide a hub or attaching portion 6 having a passage 7 of any approved design rendering the device capable of attachment to a standard valve stem. Radiating from the hub is a hollowed cored lever 8, which, in the present instance, is tapered so that its reduced end is immediately adjacent to the hub. However, in this respect we are not particularly concerned and are not disposed to limit ourselves. Extending through the walls of the handle are perforations 9 which preferably occupy a position along the under side of the lever. Two perforations are found best in practice, and as illustrated, they open at their outer ends to the atmosphere, and at their inner ends to the bore 10 of the lever, whereby to make the structure conducive to the circulation of air through the handle in order that its walls may be maintained in a condition of relatively low temperature.

At the outer free end of the lever, the walls thereof are formed with an annular undercut groove 11, preferably defined by a wall 12 which extends at an angle which would make it intersect a line drawn longitudinally through the lever at a point remote from the free outer end of the lever, and a wall 13 which extends at an angle to the wall 12, the line of which would intersect a line drawn axially through the lever but at a point closer to the free extremity of the lever. The thickness of the walls of the lever beyond the wall 13 of the groove 11 is less than the thickness of the material at the wall 13 so as to be disposed in the path of inward application of the normally circular flange 14 of a sealing and classifying cap 15. The cap 15 is formed preferably of brass, and at the center it is formed with an embossed letter, either "H" indicating hot water, or "C" indicating cold water. This makes it possible to fit the lever to either the hot or cold water faucet, and then classify the same to meet the conditions by simply pressing the cap, with its suitable character, into engagement with the latter. In applying the cap, the annular wall or skirt 14 is inserted into the free end of the lever where it will be embraced by a portion of the wall 12. The cap may be struck with a mallet or suitable instrument, not enough to mar or abuse same, and on so doing the skirt or wall 14 marginally will be intercepted by the wall 13 and the wall swaged or upset where it will take the contour of the angle of the wall 12. In other words, the marginal edge of the skirt is crimped into position with respect to the lever and same is thereby held permanently in position.

We claim as our invention:

1. A handle comprising a hollow body, an attaching hub at one end of the body and a cap inserted in the opposite end of the body and having a wall upset against co-acting walls thereof.

2. A handle comprising a hollow body open at one end, and a cap having identification marks formed thereon, the said cap being upset against co-acting walls of the body so as to permanently secure the cap to the body and maintain a condition of external exposure of the identifying mark of the cap.

3. A valve lever comprising a hollow body having an undercut groove at one end, and a cap for closing said end of the body and having an expansible skirt adapted to be extended into the undercut groove when pressure is applied against the cap.

EMIL PRICE.
WILLIAM A. PFISTER.